Jan. 6, 1970     Z. CH. NEWMAN     3,487,637
FLUID COLUMN FORCE TRANSMITTING DEVICES
Filed April 10, 1967     2 Sheets-Sheet 2
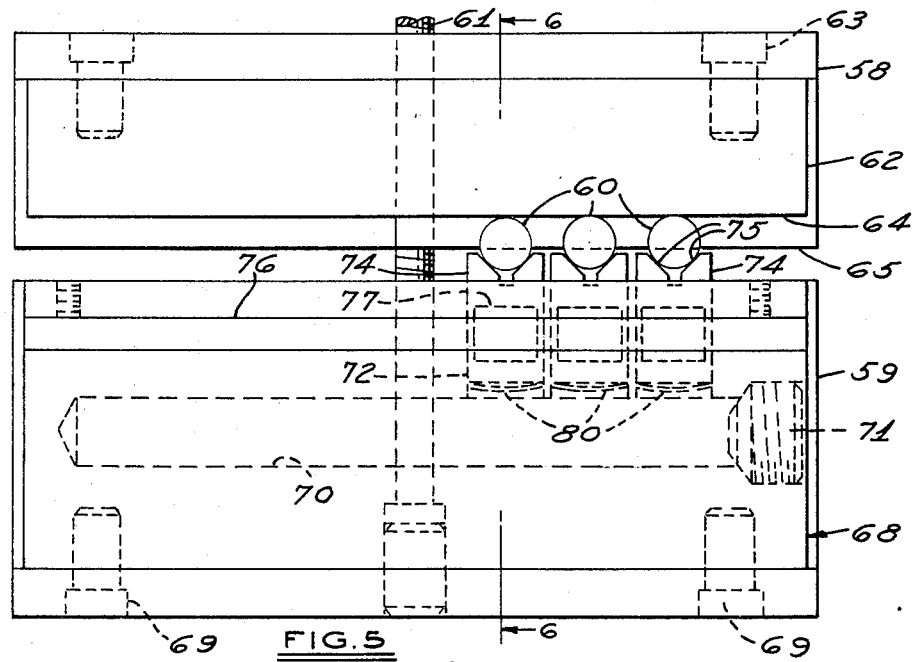
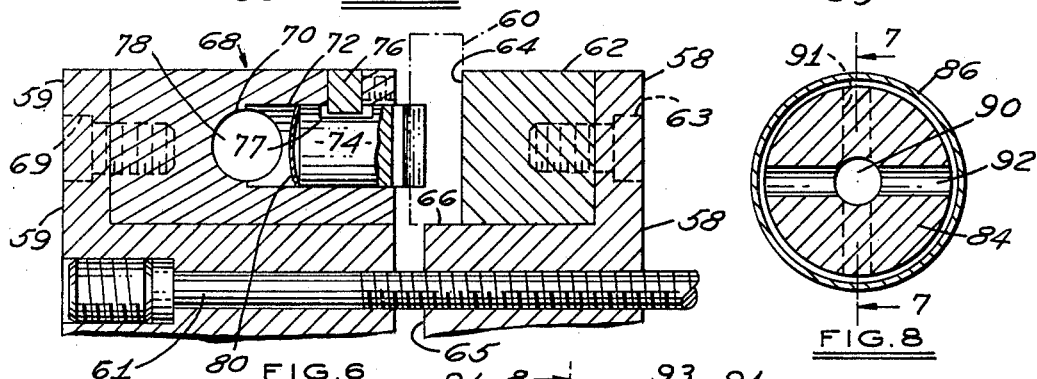
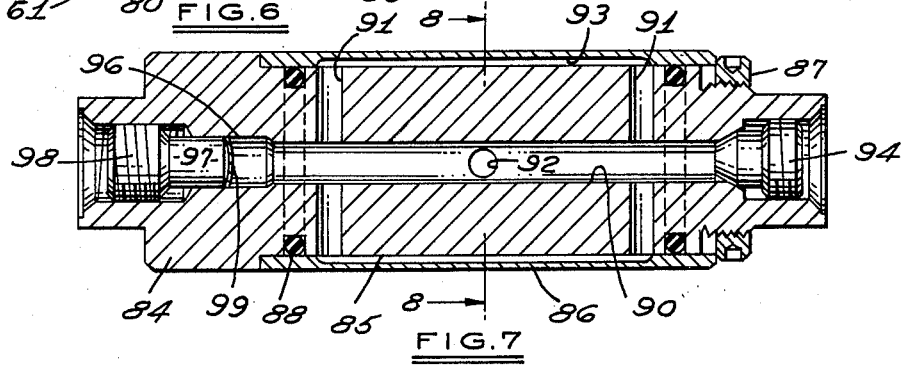
INVENTOR
ZDENEK CH. NEWMAN
BY
ATTORNEYS United States Patent Office 3,487,637
Patented Jan. 6, 1970

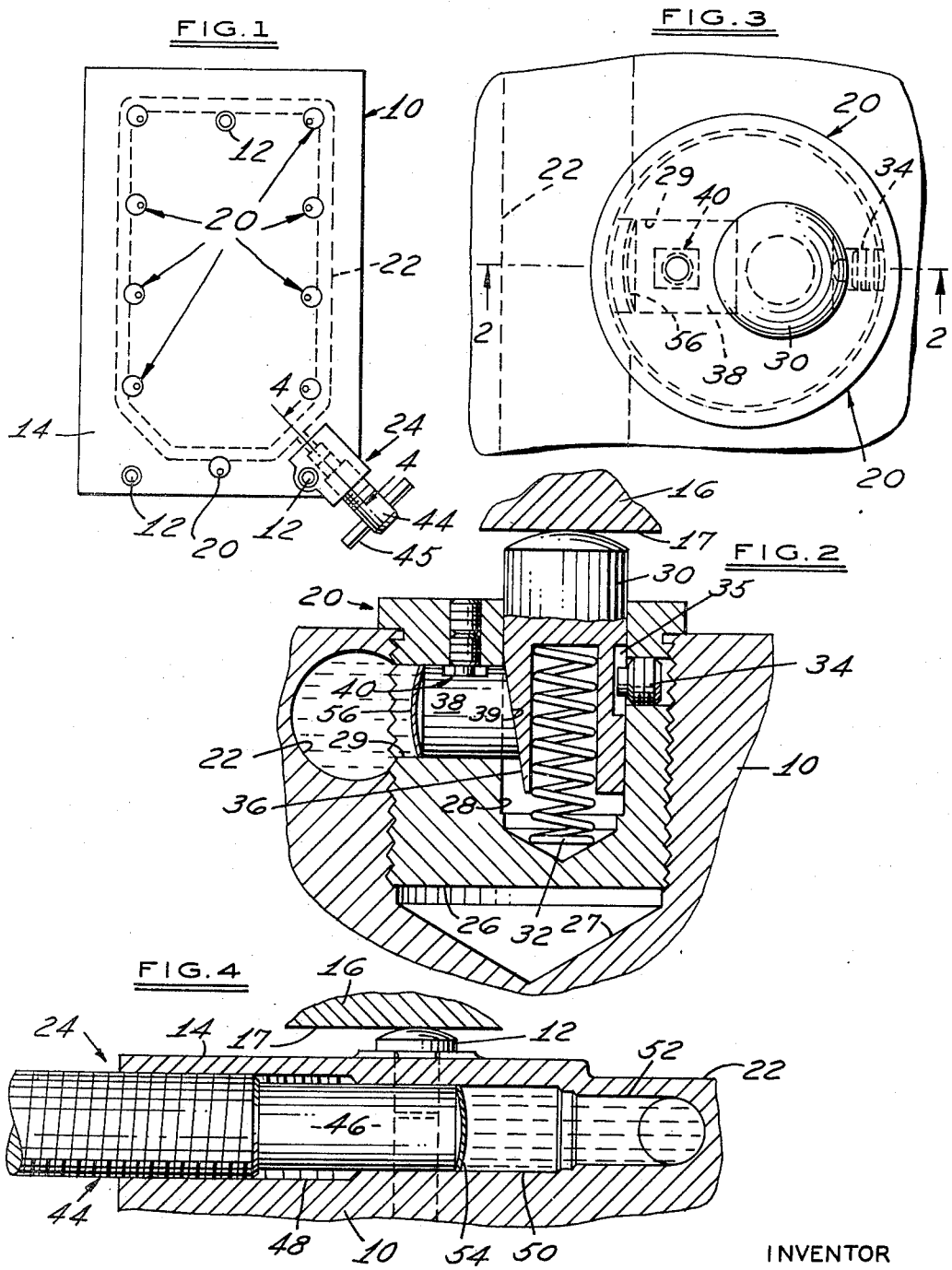

3,487,637
FLUID COLUMN FORCE TRANSMITTING DEVICES
Zdenek Ch. Newman, 30 E. Philadelphia,
Detroit, Mich. 48202
Filed Apr. 10, 1967, Ser. No. 629,795
Int. Cl. F15b 7/00, 7/08
U.S. Cl. 60—54.5      11 Claims

ABSTRACT OF THE DISCLOSURE

A device for applying force to one or more movable elements by movement of a force-transmitting piston mounted in a cylinder and acting against a fluid column extending through a fluid passage between the cylinder and the movable element, wherein the fluid column consists of an elastoplastic substance, and a sealing element is interposed between the piston and the fluid column.

BACKGROUND OF THE INVENTION

Field of the invention

The invention pertains to improvements in devices for transmitting force, the force being applied to a piston and transmitted through a fluid column to a movable element, in which the fluid column consists of an elastoplastic substance separated from the piston by a sealing member. The movable element to which the force is applied may have a clamping, supporting or positioning action.

Description of the prior art

Hydraulic devices such as multiple jaw clamps, expanding arbors, and machining fixtures having multiple adjustable supporting points have been previously proposed, a multiple jaw clamp being shown in U.S. Patent 419,885 and a multiple support fixture being disclosed in U.S. Patent 2,337,573. In all such prior devices with which I am familiar, air or hydraulic fluid has been employed as a force transmitting medium, and in order for such devices to be effectively operable, relatively great precision must be employed in their manufacture in order to minimize leakage and loss of force transmitted by the fluid column. In other words, the problem of sealing the fluid column is great, particularly in devices where the fluid column transmits the force from one piston to another piston, and has prevented such devices from coming into general use despite their obvious utility.

SUMMARY OF THE INVENTION

The construction of the present invention eliminates sealing problems in devices of this type and also reduces the tolerances between the working parts to limits readily obtainable with relatively low cost manufacturing techniques. These results are obtained by the employment of an elastoplastic substance as a fluid column and by interposing a sealing member, preferably a resilient convex washer or diaphragm, between the end of this fluid column and the force transmitting piston, with a similar sealing member used at the other end of the column in constructions where a force receiving piston is employed. The elastoplastic substance may consist of a mixture of a plastic copolymer, a plasticizer and graphite, which may be poured into the fluid passage and cured into an elastoplastic mass to form the fluid column.

Other features and advantages of the invention will appear from the description to follow of the embodiments thereof shown in the accompanying drawings.

DESCRIPTION OF THE DRAWINGS

FIGURE 1 is a plan view of a machining fixture incorporating a plurality of work piece supports positionable by the construction of the invention;

FIGURE 2 is an enlarged sectional elevation of one of the supports, taken as indicated by the line 2—2 of FIGURE 2;

FIGURE 3 is a plan view of the support shown in FIGURE 2;

FIGURE 4 is an enlarged sectional elevation taken as indicated by the line 4—4 of FIGURE 1;

FIGURE 5 is a plan view of a multiple jaw clamping fixture constructed in accordance with the invention;

FIGURE 6 is a sectional elevation taken as indicated by the line 6—6 of FIGURE 5;

FIGURE 7 is a sectional elevation of an expanding mandrel constructed in accordance with the invention, taken as indicated by the line 7—7 of FIGURE 8; and FIGURE 8 is a transverse sectional view taken as indicated by the line 8—8 of FIGURE 7.

DESCRIPTION OF THE PREFERRED EMBODIMENTS

The fixture of FIGS. 1–4 consists of a plate 10 having three work piece supporting buttons 12 suitably secured to the upper surface 14 thereof, one button being shown in elevation in FIG. 4. A work piece 16 is placed on the buttons 12 and the work piece has a surface 17 of irregular contour which must be supported at a plurality of locations between the buttons 12.

A supporting unit 20 is installed at each of these locations in a socket provided in the plate 10 and all of the units 20 are connected to a fluid passage or manifold 22 which communicates with a force transmitting cylinder and piston unit 24.

As shown in FIGS. 2 and 3, each of the supporting units 20 consists of a cylindrical body 26 mounted in a socket 27 in the plate 10 and having a longitudinal bore 28 intersected by a lateral bore 29. A work piece supporting plunger 30 is mounted in the longitudinal bore 28, being normally urged outwardly by a spring 32, and having its longitudinal and rotational movement limited by a key member 34 engaging a keyway 35. The supporting plunger 30 is also provided with a tapered or wedge-shaped side surface 36 facing the lateral bore 29, and a piston 38 having a complementary shaped end 39 is engageable with the side surface 36. Longitudinal and rotational movement of the piston 38 is limited by a key and keyway 40.

Referring to FIG. 4, the cylinder and piston construction consists of a screw 44 having a handle 45 on its outer end and a cylindrical piston portion 46 on its inner end. The threaded portion 44 engages a threaded hole 48 in the plate 10 which extends into a cylinder 50 for receiving the piston 46, the cylinder being connected by a passage 52 to the manifold 22.

After the supporting units 20 have been properly mounted in their sockets, the manifold 22, passage 52 and a portion of the cylinder 50 are filled with an elastoplastic substance. While many such substances may be satisfactory for the purpose, I have at this time discovered that a mixture of a plastic copolymer, a plasticizer and graphite produces excellent operation. For the plastic copolymer I have employed either of the following compounds:

Compound No. 1:      Parts
    Vinyl chloride _____ 80
    Dimethyl meleate _____ 10
    Diethyl meleate _____ 10
Compound No. 2:
    Vinyl chloride _____ 80
    Ethylene glycol dicrotonate _____ 20

Sulpho phenolate acts as a satisfactory plasticizer for either of the above compounds.

The plastic copolymer, plasticizer and graphite can be mixed in varying proportions depending on the density and degree of elasticity desired. Representative proportions by volume are: 50% plastic copolymer, 45% plasticizer and 5% powdered graphite. This mixture is a liquid which will readily pour at a temperature of 150° F. to 175° F. and will polymerize or gell into a denser elastoplastic mass when cooled to room temperature.

When the liquid mixture has been poured into the aforementioned passages and cylinder 50, the elastoplastic fluid column subsequently formed therein will not readily flow and has no tendency to flow by capillary action between the walls of the cylinders and pistons 46 and 38, even when these pistons are relatively loosely fitted in their respective cylinders.

Sealing means are interposed between the ends of the fluid column and the pistons 38 and 46 to prevent fluid flow around the pistons when the column is under pressure, and in the construction shown, this sealing means consists of a concavo-convex disc or washer 54 at the end of the force transmitting piston 46 and a similar washer 56 at the end of the force receiving piston 38. The washer 54 and 56 are relatively resilient, being formed of brass or plastic, and are preferably mounted with their convex surfaces facing the fluid column. When pressure is applied by tightening the screw 44, the washers tend to straighten out or expand and engage the sides of the cylinders in which they are mounted.

Operation of the device of FIGS. 1–4 is as follows:

When a work piece 16 is placed on the three stationary rest buttons 12 with the force applying piston 46 moved outwardly of the cylinder 50, all of the adjustable supporting plungers 30 will move to a proper position of engagement with the surface 17 of the work piece. The screw 44 is then turned to move the piston 46 inwardly, applying force through the elastoplastic fluid column to all of the pistons 38 of the supporting devices 20, placing the wedge surfaces 36 and 39 of the plunger 30 and piston 38 respectively in firm engagement and locking the plungers in proper position. The sealing discs 54 and 56 are each expanded against the wall of their respective cylinders and the fluid column is in effect locked under pressure.

FIGS. 5 and 6 illustrate the application of the invention to a multiple, floating jaw clamping fixture which may be mounted on the jaws 58 and 59 of a vise for grinding a plurality of tools 60. The vise structure, shown schematically, includes a screw 61 for moving the jaw 58 relative to the jaw 59.

A block 62 is secured to the vice jaw 58 by screws 63, the block 62 having a tool engaging face 64 terminating inwardly of the inner edge 65 of the jaw 58 to leave a ledge 66 on which the ends of the tools 60 may rest. A clamping jaw assembly 68 is mounted on the vise jaw 59 by screws 69. This clamping jaw assembly 68 includes a passage 70, sealed by a plug 71, and communicating with a cylinder 72 for each of the clamping piston 74. Each clamping piston 74 is equipped with V-jaws 75 and assembled in its cylinder 72 by a common key bar 76 engaging a notch 77 on each piston 74.

The passage 70 is filled with an elastoplastic substance as described above, forming a fluid column 78, and a resilient sealing disc 80 is placed between the fluid column and the adjacent end of each of the clamping pistons 74.

In the operation the fixture, the vise jaws 58 and 59 are separated an extent sufficient for free insertion of each of the tools 60 between the jaws 75 of one of the pistons 74 and the opposing face 64 of the block 62. When the vise jaws 58 and 59 are moved toward each other by the screw 61, each of the tools 60 will be centered between the jaws 75 of one of the pistons 74 by the clamping action of the planar face 64, and each of the pistons 74 will individually be moved inwardly of its respective cylinder 72, compensating for any dimensional differences in the tools 60 and piston jaws 75, and progressively building up pressure in the fluid column 78 which is transmitted thereby to exert uniform clamping force on each of the pistons 74 and on the tool 60 engaged thereby. This pressure expands the sealing discs 80 and locks the fluid column under pressure. Each of the pistons 74 acts to apply fluid pressure to the others.

An application of the invention to the construction of an expanding mandrel is illustrated in FIGS. 7 and 8. The mandrel has a body 84 with a portion 85 of reduced diameter receiving a tubular sleeve 86 held in position by a nut 87. A sealing ring 88 is mounted in a groove in the body 84 adjacent each end of the sleeve 86, engaging the inner surface thereof.

A passage 90 extends axially through the body 84 and in intersected by transverse passages 91 and 92 at right angles to each other, the passages 91 and 92 communicating with an annular space between the inner surface 93 of the sleeve and outer surface 85 of the body 84. One end of the axial passage 90 is closed by a plug 94, and the other end is counterbored to form a cylinder 96 which receives a piston extension 97 on a threaded member 98. The passages 90, 91, 92 and space 93 are filled by an elastoplastic substance to form a fluid column and a resilient sealing disc 99 is mounted between the fluid column and end of the piston 97.

Inward movement of the pistons 97 applies force through the fluid column to the sleeve 86 which acts as a movable member at the other end of the fluid column and expands into firm engagement with an article (not shown) mounted on the sleeve; and, as in the other constructions, the sealing disc 99 straightens out or expands to lock the fluid column in force transmitting condition.

The foregoing examples are considered as representative only of the possible applications of the invention which provides a practical form of hydraulic force transmitting mechanism inexpensive in manufacture and overcoming the leakage problems of prior devices of this type.

While preferred embodiments have been described above in detail, it will be understood that numerous modifications might be resorted to without departing from the scope of the invention as defined in the following claims.

I claim:

1. In a force transmitting device having a force applying end, a force receiving end, a fluid passage connecting said ends and a fluid column extending between said ends and filling the passage; the improvement comprising a cylinder provided at one of said ends in communication with the fluid passage, a piston mounted in the cylinder, an elastoplastic substance forming the fluid column, a concavo-convex metallic disc spring interposed between and positioned by the piston and the fluid column, said disc spring being capable of flexing into expanded sealing engagement with the cylinder wall in response to increasing pressure in the fluid column, and a movable element at the other of said ends in operative relation with the fluid column.

2. A device according to claim 1 wherein the concave face of the disc spring is adjacent the piston.

3. A device as claimed in claim 1 wherein the elastoplastic substance includes a copolymer of vinyl chloride and a plasticizer.

4. A device as claimed in claim 3 wherein the plasticizer is a sulfo phenolate.

5. A device as claimed in claim 3 wherein the elastoplastic substance includes graphite.

6. A device as claimed in claim 1 wherein the movable element comprises a flexible sleeve.

7. A device according to claim 1 wherein the movable element comprises a second piston, a second cylinder in communication with the fluid passage at the other of said ends receiving the second piston, and a second concavo-convex metallic disc spring is interposed between the fluid column and second piston.

8. A device according to claim 7 wherein the first and second pistons are each provided with article engaging means on the face thereof opposite to the face adjacent to the fluid column.

9. A device according to claim 1 wherein the movable element is at said force receiving end and comprises a force receiving piston mounted in a cylinder communicating with the fluid passage and separated from the fluid column by a second concavo-convex disc spring, a plunger movably mounted in a bore intersecting said force receiving end cylinder, resilient means normally urging the plunger in a direction away from said force receiving end cylinder, and surfaces on the plunger and force receiving piston engageable in response to the transmission of force through the fluid column to prevent movement of the plunger in a direction toward said force receiving end cylinder.

10. A device according to claim 1 wherein said one end at which said cylinder, piston and disc spring are provided is the force applying end and includes means for applying force to said piston, the device having a plurality of force receiving ends to which the fluid passage and fluid column extends and each provided with one of said movable elements.

11. A device according to claim 10 wherein each movible element comprises a force receiving piston mounted in a cylinder communicating with the fluid passage and separated from the fluid column by one of the concavo-convex sealing disc springs.

References Cited

UNITED STATES PATENTS

| | | |
|---|---|---|
| 2,656,680 | 10/1953 | Brunner. |
| 3,357,319 | 12/1967 | Hagerty _____ 92—245 |
| 2,797,602 | 7/1957 | Atherholt et al. __ 60—54.5 XR |
| 2,895,773 | 7/1959 | McConnaughey ___ 92—249 XR |
| 3,217,922 | 11/1965 | Glasgow _____ 277—206 XR |
| 3,335,569 | 8/1967 | Atherholt _____ 60—54.5 |

FOREIGN PATENTS 303,201  12/1928  Great Britain.

MARTIN P. SCHWADRON, Primary Examiner
ROBERT R. BUNEVICH, Assistant Examiner

U.S. Cl. X.R.

60—54.6; 92—245